(12) United States Patent
Nelson

(10) Patent No.: US 8,045,803 B2
(45) Date of Patent: Oct. 25, 2011

(54) HANDWRITING RECOGNITION SYSTEM AND METHODOLOGY FOR USE WITH A LATIN DERIVED ALPHABET UNIVERSAL COMPUTER SCRIPT

(76) Inventor: Jeffrey Scott Nelson, Portland, OR (US)

(*) Notice: Subject to any disclaimer, the term of this patent is extended or adjusted under 35 U.S.C. 154(b) by 1019 days.

(21) Appl. No.: 11/983,570

(22) Filed: Nov. 9, 2007

(65) Prior Publication Data

US 2009/0123073 A1   May 14, 2009

(51) Int. Cl.
*G06K 9/18* (2006.01)

(52) U.S. Cl. ........ 382/182; 382/187; 382/188; 382/189; 382/312; 382/313; 345/16; 345/17

(58) Field of Classification Search ........................ None
See application file for complete search history.

(56) References Cited

U.S. PATENT DOCUMENTS

| 4,718,102 | A  | * | 1/1988 | Crane et al. ................... 382/185 |
| 5,050,219 | A  |   | 9/1991 | Maury |
| 5,596,656 | A  |   | 1/1997 | Goldberg |
| 5,610,996 | A  | * | 3/1997 | Eller ............................ 382/187 |
| 6,366,697 | B1 | * | 4/2002 | Goldberg et al. ............. 382/186 |
| 6,816,859 | B2 |   | 11/2004 | Goldberg et al. |

* cited by examiner

*Primary Examiner* — Sath V Perungavoor
*Assistant Examiner* — Jason Heidemann
(74) *Attorney, Agent, or Firm* — Mark S. Hubert

(57) ABSTRACT

A novel symbollogy derived from the lower-case cursive English alphabet (which is compatible with Latin alphabet derived languages), and a multi-step identification program designed to invoke the strengths of the XY Cartesian coordinate mapping system and a specific multi-step identification criteria designed to work in concert so as to allow absolute identification of each symbol. Each symbol is written onto an electronic tablet capable of identifying and distinguishing each individual symbol from a range of possible stroke patterns and then outputting or storing the symbol's assigned English alphabet counterpart. The combination of this symbollogy and recognition program allows high writing speed with the highest possible recognition potential.

11 Claims, 13 Drawing Sheets

If the number of points = 2 check for deviation.

● Establish a deviation point midway between the start point and the endpoint.

▲ Check whether the midpoint on the curve is greater, less than or equal to the deviation point.

Calculate the two slopes: start point to midpoint and midpoint to end point.

The relationship between the two slopes determines the output.

boundary slopes v.s. line slopes

Line slopes (Ls) are determined after each penup event.

$$\text{line slope} = \frac{\text{abs}(x1-x2)}{\text{abs}(y1-y2)}$$

if change in x = change in y slope value = 1

Boundary slope values (Bs) are established by experimentation. Most are between .8 and 1.2.

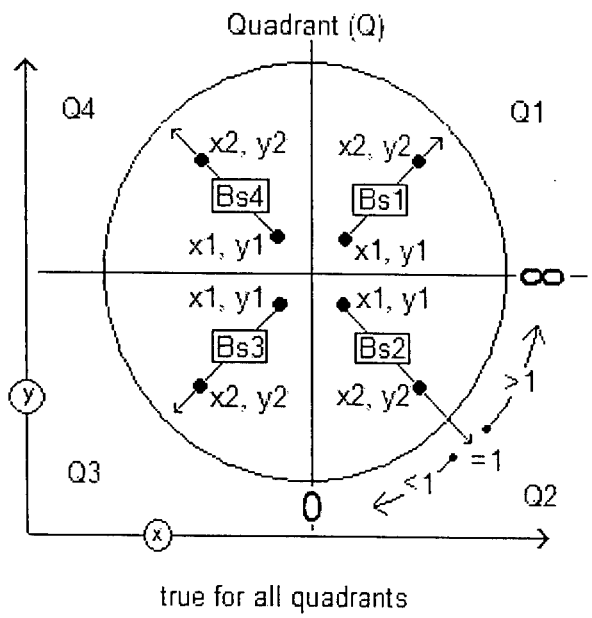

true for all quadrants

| As a line angle approaches the y axis its slope value decreases. | As a line angle approaches the x axis its slope value increases. |
|---|---| example:

Identifying a symbol by comparing its start quadrant line slope with the established boundary slope value.

If the start quadrant, ID and no. of points are identical.

Compare the line slope of the start quadrant (Ls1) to the boundary slope (Bs1).

Bs1 has been establshed for these two symbols to be the value of .8.

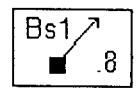

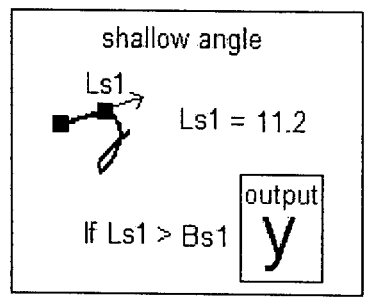

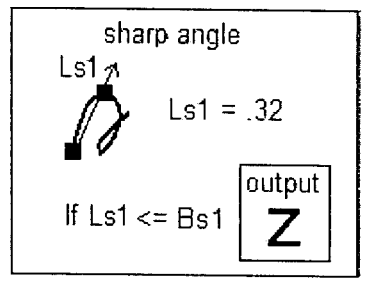

FIG 11

HANDWRITING RECOGNITION SYSTEM AND METHODOLOGY FOR USE WITH A LATIN DERIVED ALPHABET UNIVERSAL COMPUTER SCRIPT

FIELD OF THE INVENTION

This invention relates to handwriting recognition and handwriting representation and more particularly to an electronic writing system composed of a script (symbollogy) and recognition program thereof for handheld, portable, and fixed computing devices and the like.

BACKGROUND OF THE INVENTION

Personal computers in the first decade of the $21^{st}$ century have become ubiquitous, from highly compact laptops, to personal digital assistants (PDAs), to phones with web surfing and data entry capabilities. Text entry on these devices is accomplished in primarily one of three ways: miniaturized keyboards; virtual-keyboards, where a keyboard is shown on a touch screen, and input is done by tapping on the letters; and letter or word recognition, where symbols are individually written on a touch sensitive screen or equivalent surface and then translated to letters in the currently activated text field by a computerized symbol recognition system. The process of writing or data entry through miniaturized and virtual keyboards can be cumbersome, especially for those with large fingers or poor coordination. Text entry via standard or semi-standard letter recognition has met with mixed results with many users finding it frustrating and inaccurate. Symbol recognition systems that use non-standard characters which have little or no stroke relationship to the target alphabet symbol have proved to be unserviceable. What is needed for the $21^{st}$ century is a universal writing system designed exclusively for use on computers which includes a new symbollogy consisting of a very specific set of simple and definitive stroke patterns. These patterns when strategically arranged become highly serviceable to those familiar with any Latin derived language. Coupled to that symbollogy must be recognition program specifically designed for that particular symbollogy. This character/program integration produces the highest level of recognition that can be achieved for a symbol recognition program. The result is a comfortable, low error, high speed, stationary writing system. The set of stroke patterns under this invention offer the most simple, intuitive, non-classical system of text input which can be devised for Western style electronic writing. Additionally, combining this technology with a spoken letter output program would be very useful to the visually impaired.

Although numerous systems have been devised that attempt to recognize printed or cursive characters, their recognition accuracy is poor. The more recent systems utilize a nine or twelve point grid system wherein the stylus must pass within a minimum distance of a certain number of select points to establish identification. However, poor, or clumsily written characters still elude proper identification. The combining of low-complexity characters which have been designed for ease of identification with a recognition program aimed at accurate distinction of those specific characters will achieve higher accuracy results and offer greater writing speed than a system designed to use and recognize an existing complex script.

The electronic writing system of the future must be accurate and so intuitively familiar enough to the user that it may be written without hesitation as to allow symbol writing at letter note taking speed. Accuracy requires that each symbol be easily computer distinguishable from one another despite poor penmanship or a pre-biased slant of the user's handwriting. Intuitive familiarity requires that one hundred percent of the symbols match the "feel" of the target alphabet so as to speed up the user's initial learning curve but more importantly, to prevent latent brain/hand conflicts from arising at high writing speed once the system has been mastered.

The following system utilizes a symbollogy designed to abbreviate, yet closely approximate, the essence of the writing strokes used in any Latin derived alphabet. The symbollogy is converted to its alphabetic counterpart based on an extremely accurate, multi-step identification process. In the present invention, the symbology was designed around the recognition system's capabilities and limitations so as to invoke the strengths of the XY Cartesian coordinate mapping system and the specific multi-step identification criteria resulting in enhanced identification accuracy. The majority of the prior art encompasses recognition systems that were designed to identify existing alphabetic characters or alphabets that are slight variations thereof, and as such have less accurate positive identification thresholds.

Henceforth, a simple, accurate handwriting recognition system would fulfill a long felt need in the PDA, cell phone and computer industries. This new invention utilizes and combines known and new technologies in a unique and novel configuration to overcome the aforementioned problems and accomplish this.

SUMMARY OF THE INVENTION

Accordingly, an object of the present invention is to provide an improved system of symbollogy and writing method using a universal set of simple and definitive stroke patterns which are formed to create smooth, "in place," cursive-like writing symbols. A stroke slope based recognition program utilizing multiple identification criteria steps looking at start quadrants, the number of XY directional changes (change points), stroke slopes, concavity, convexity and critical angle comparisons determined from XY Cartesian coordinate mapping, works in conjunction with this new symbollogy to allow for absolute identification of each symbol with a high error tolerance having essentially no gaps in symbol recognition.

By development of a system of symbology that is designed around the multi-step identification criteria as well as the intuitive, Latin emulating writing strokes, a happy medium is struck between user friendliness and enhanced recognition accuracy.

It is an object of the present invention to realize the highest level of accuracy in character identification through the synergistic coupling of both a new, universal symbollogy and a rigorous, multi-criteria system for the correlation of the symbols to their appropriate Latin based character.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 5. illustrates the modification of the 26 primary symbols;

FIG. 8. illustrates the modification of the secondary set of strokes;

FIG. 11. illustrates the detailed steps for the handwriting recognition discrimination between two neighboring primary symbols (y and z) under the invention.

DETAILED DESCRIPTION

Figure 1:
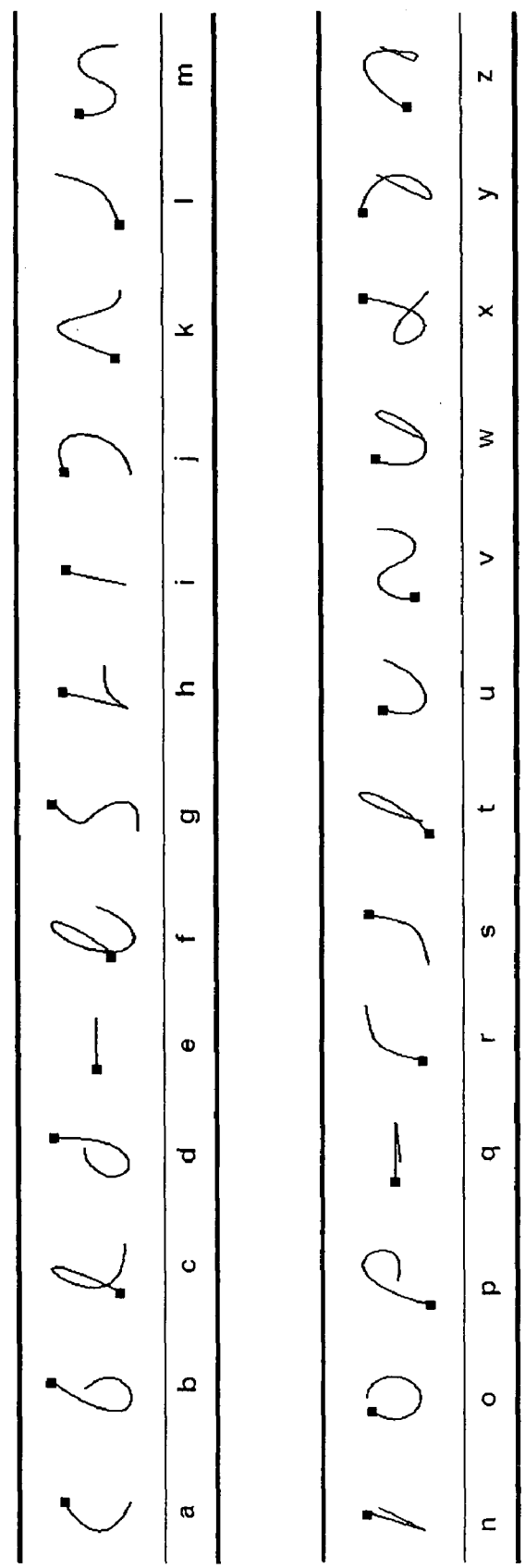
FIG. 1. illustrates the preferred alphanumeric system of 26 universal symbols.

Referring now to FIG. 1 it can be seen that the universal computer script has 24 distinct stroke patterns of which a total of 26 primary symbols can be derived. It can be seen that the symbols for j and p as well as the symbols for b and o have the same stroke patterns. Each primary symbol is able to be recognized and thus correlated to be a character (letters a to z) of the Latin derived alphabet.

Figure 5:
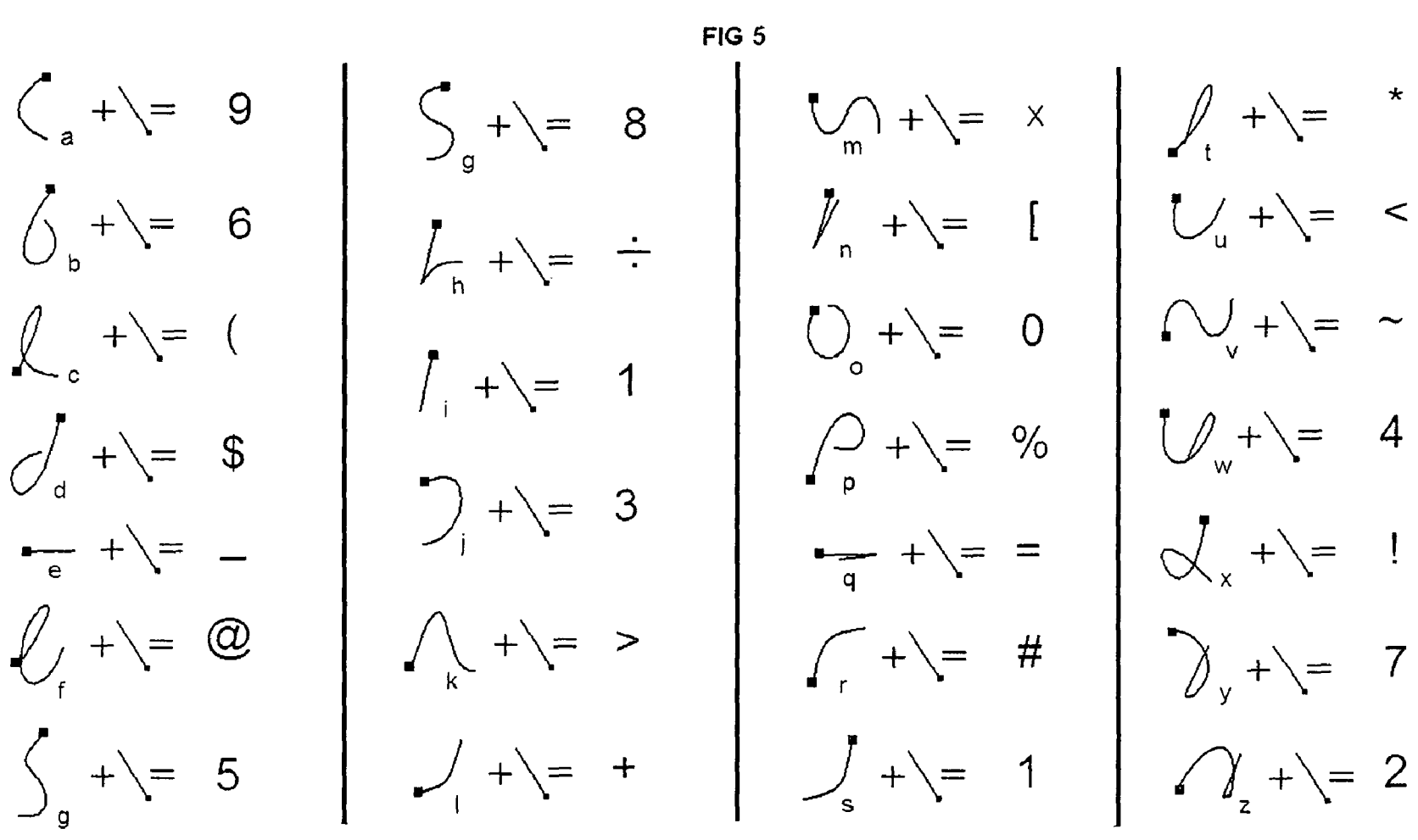

Referring to FIG. 5 modification of the primary symbols can be seen. Modification of the primary symbols is achieved by following a primary symbol by a modifier symbol. The modified primary symbols are able to be recognized and correlated as a mathematical number, a punctuation change or mark, a mathematical operator or a symbol of the Latin derived writing system.

Figure 6:
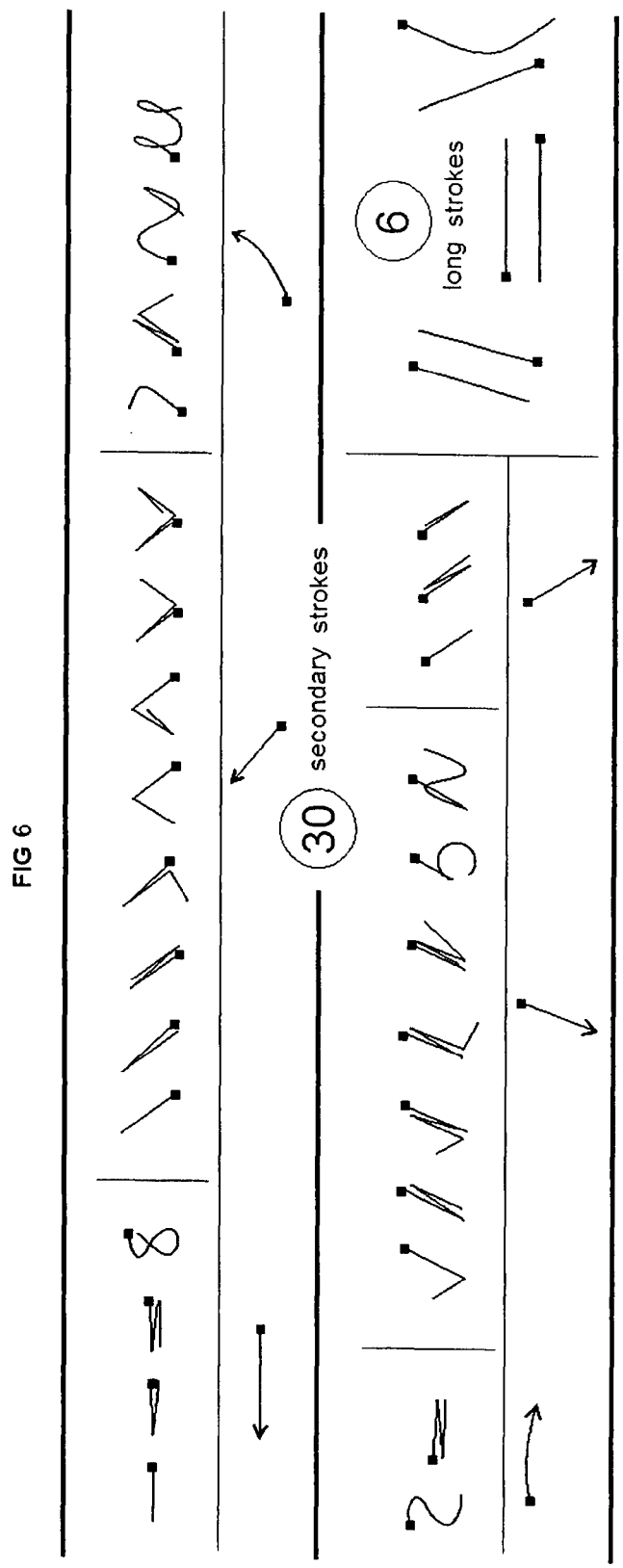
FIG. 6. illustrates the secondary set of 30 modifier and punctuation symbols.
Figure 7:
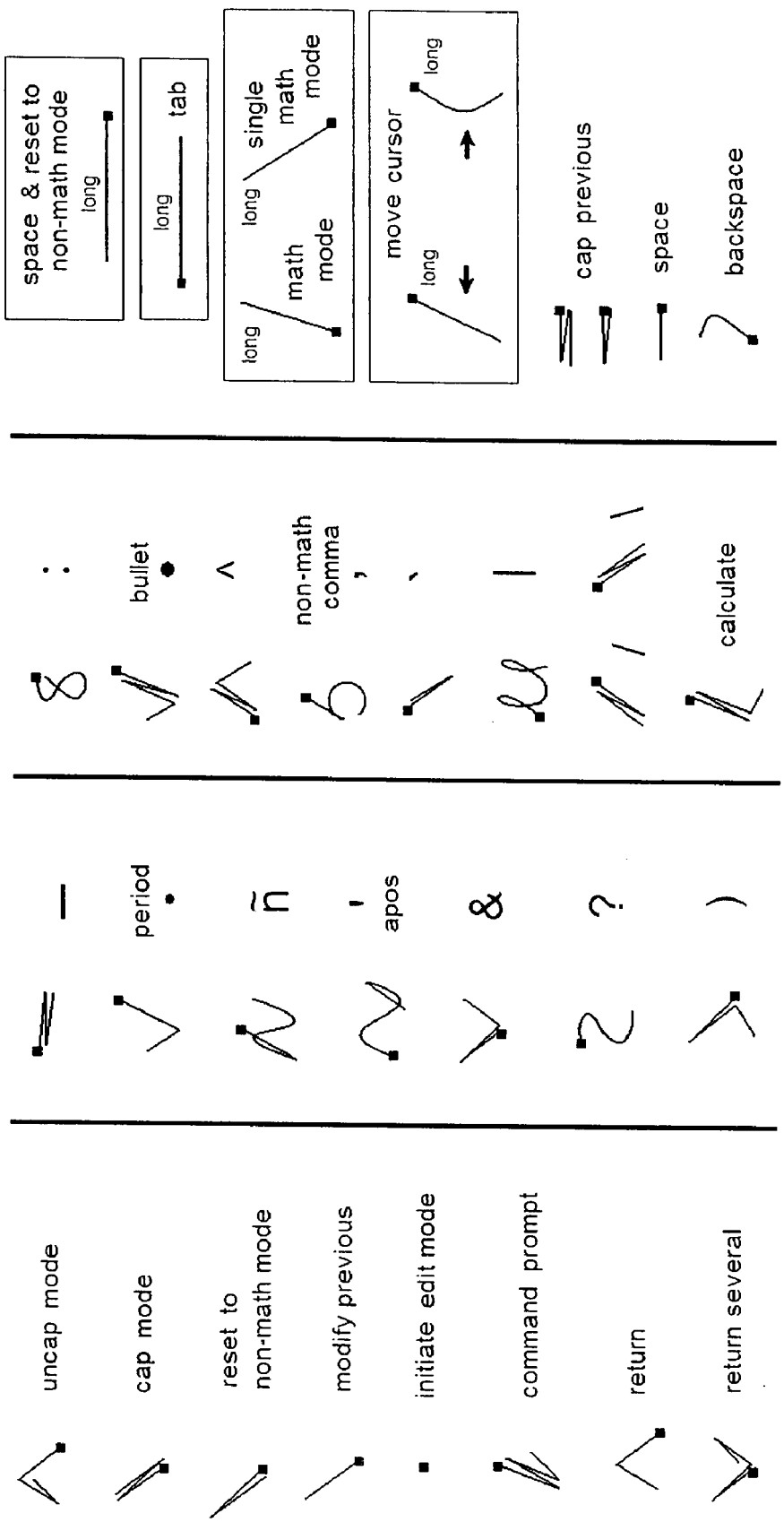
FIG. 7. defines the secondary set of symbols.

Secondary symbols can be seen in FIG. 6 & 7. Secondary symbols are comprised of additional distinct stroke patterns able to be recognized and thus correlated to be a mode initiator (for the edit or math modes), a keyboard function (text editing operations), a punctuation mark, or the calculation initiator (to carry out mathematical operations.)

Figure 8:
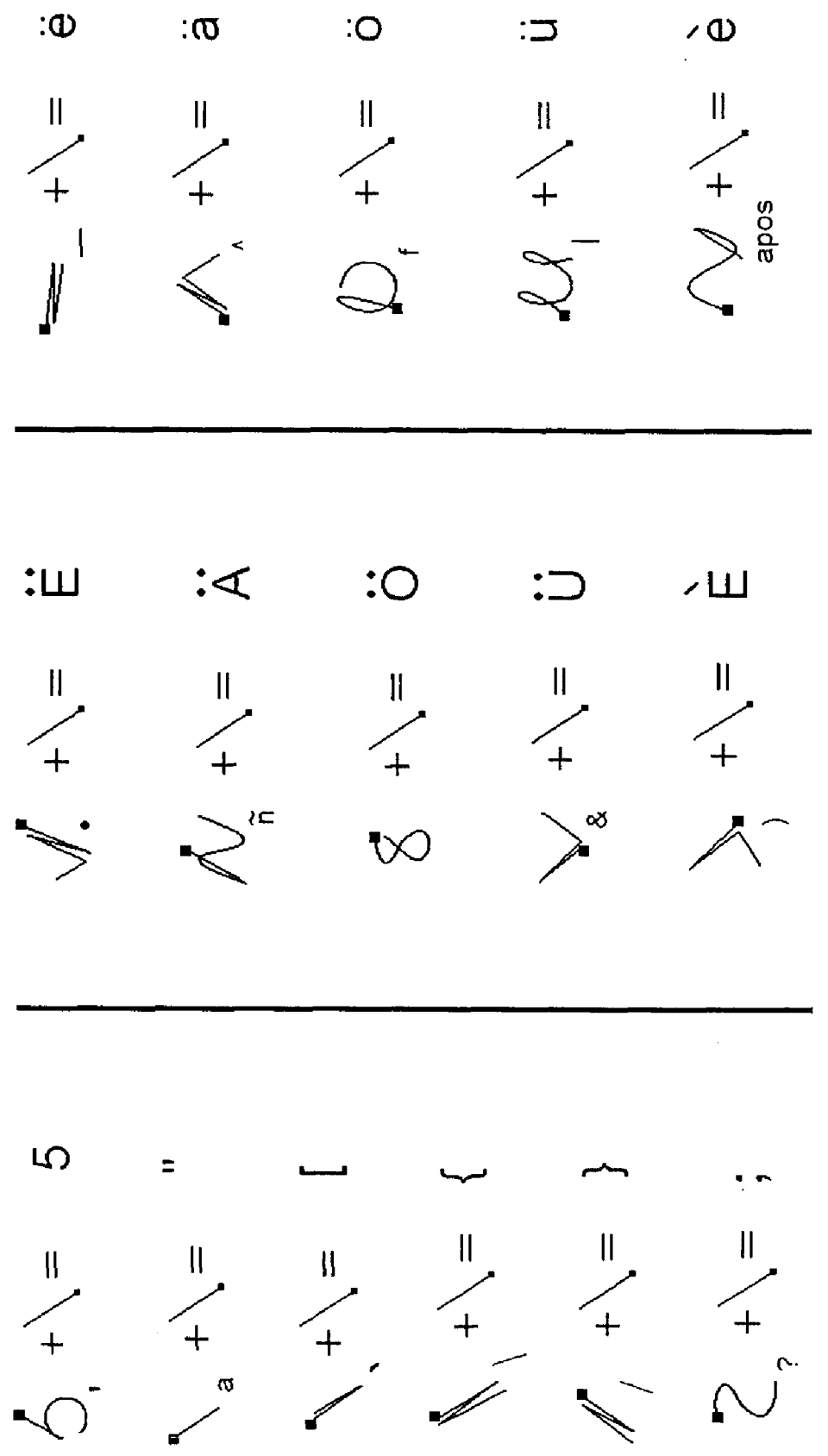

The lesser used Latin derived alphabet symbols may be recognized and correlated achieved using the secondary symbols followed by a modifier symbol as illustrated in FIG. 8.

Figure 3:
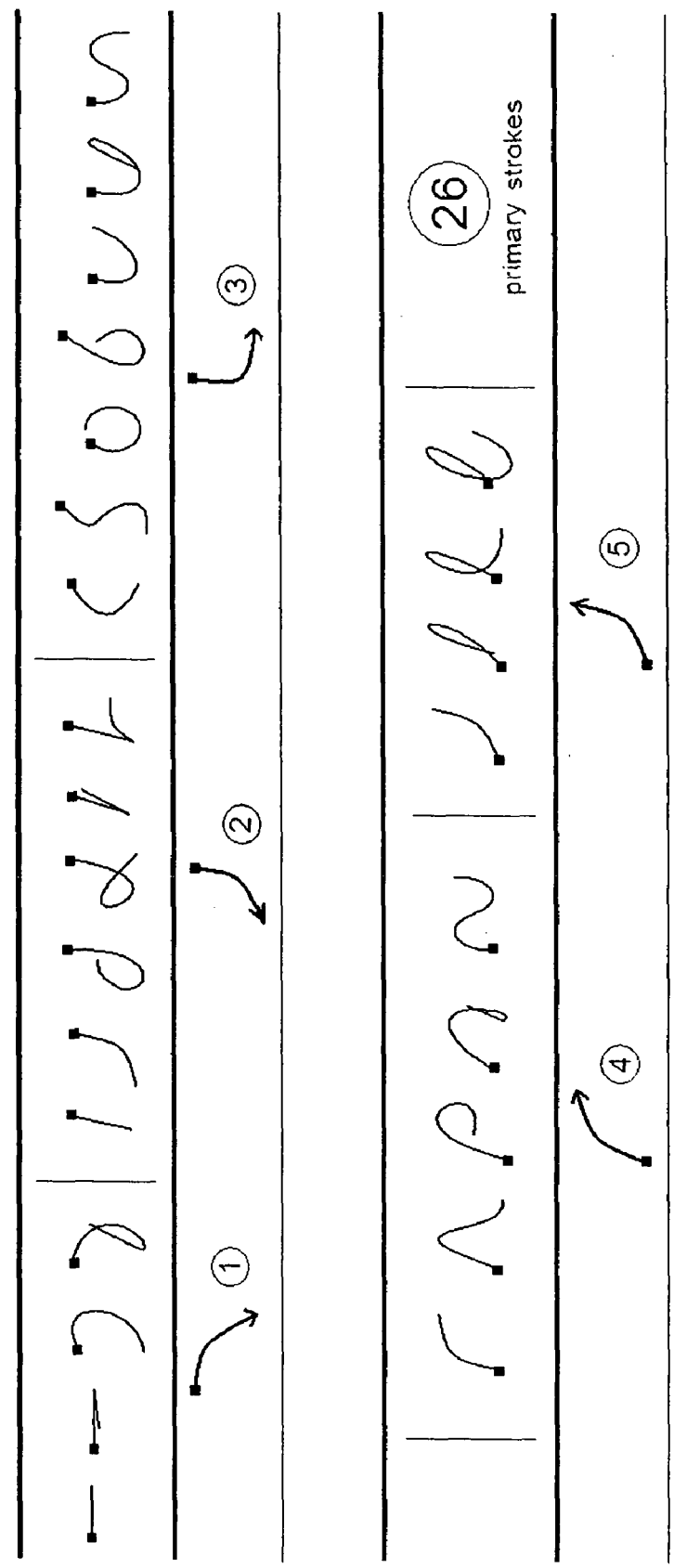
FIG. 3. illustrates the 26 primary symbols and their five general stroke flows or directions.

The stroke patterns are divided into five general stroke flows or directions as shown in FIG. 3. Stroke patterns do not break contact with the writing surface until completed. For example, the Latin printed letter "V" is composed of two stroke flows. Its stroke pattern (which results in its primary symbol) is down and to the right (stroke flow 1), then up and to the right (stroke flow 2). The change point, is the point where stroke flow 1 intersects with stroke flow 2. The difference between a symbol and a stroke pattern is that for a stroke pattern, the distance from start point to change point, between each change point, or from change point to end point is unrestricted. Thus the ability for wide variations in stroke pattern execution to be identified as the same symbol and able to be recognized and thus correlated to be (in this example) a character (a to z) of the Latin derived alphabet.

It is to be noted that the present invention identifies (recognizes) single symbols, not multiple or grouped symbols. However, as discussed above, a single symbol written consecutively with another single symbol designated as a modifier symbol, can produce any of a plethora of mathematical numbers, punctuation changes or marks, mathematical operators, symbols of the Latin derived writing system, mode initiators, keyboard functions, or calculation initiators.

The use of simple, solitary symbols simplifies the multi-step recognition process because each symbol is seen discreetly and the spatial relationship between consecutive symbols need not be considered. Unnatural timing (as found in other recognition systems) used to recognize the difference between multiple and single stroked letters is unnecessary. Physical separation of different symbols is unnecessary. All stroke patterns may be consecutively written in the same physical location.

The 26 primary symbols of FIG. 3 may be divided into five groupings based on stroke flow or direction. Each pattern can be positioned within the alphabet to closely match the "stroke essence" associated with a Latin cursive counterpart providing an intuitive process for learning of the alphabet and a powerful motivation to continue using the symbols once learned. The recognition program utilizes several parameters such as the stroke direction and critical angles of the stroke flows to allow absolute identification of each symbol.

Figure 2:
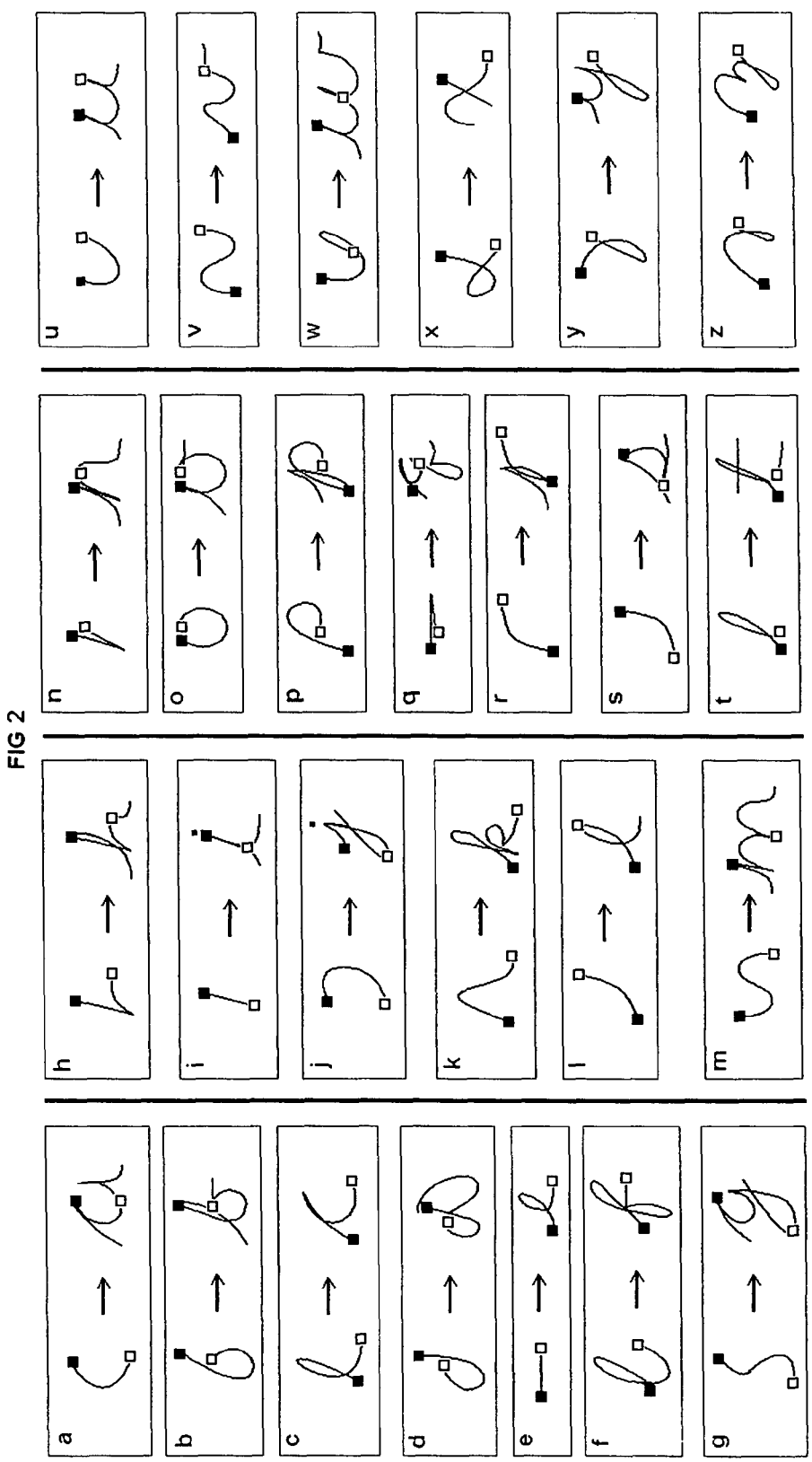
FIG. 2. illustrates the 26 primary symbols' derivations from the associated cursive letter.
Figure 4:
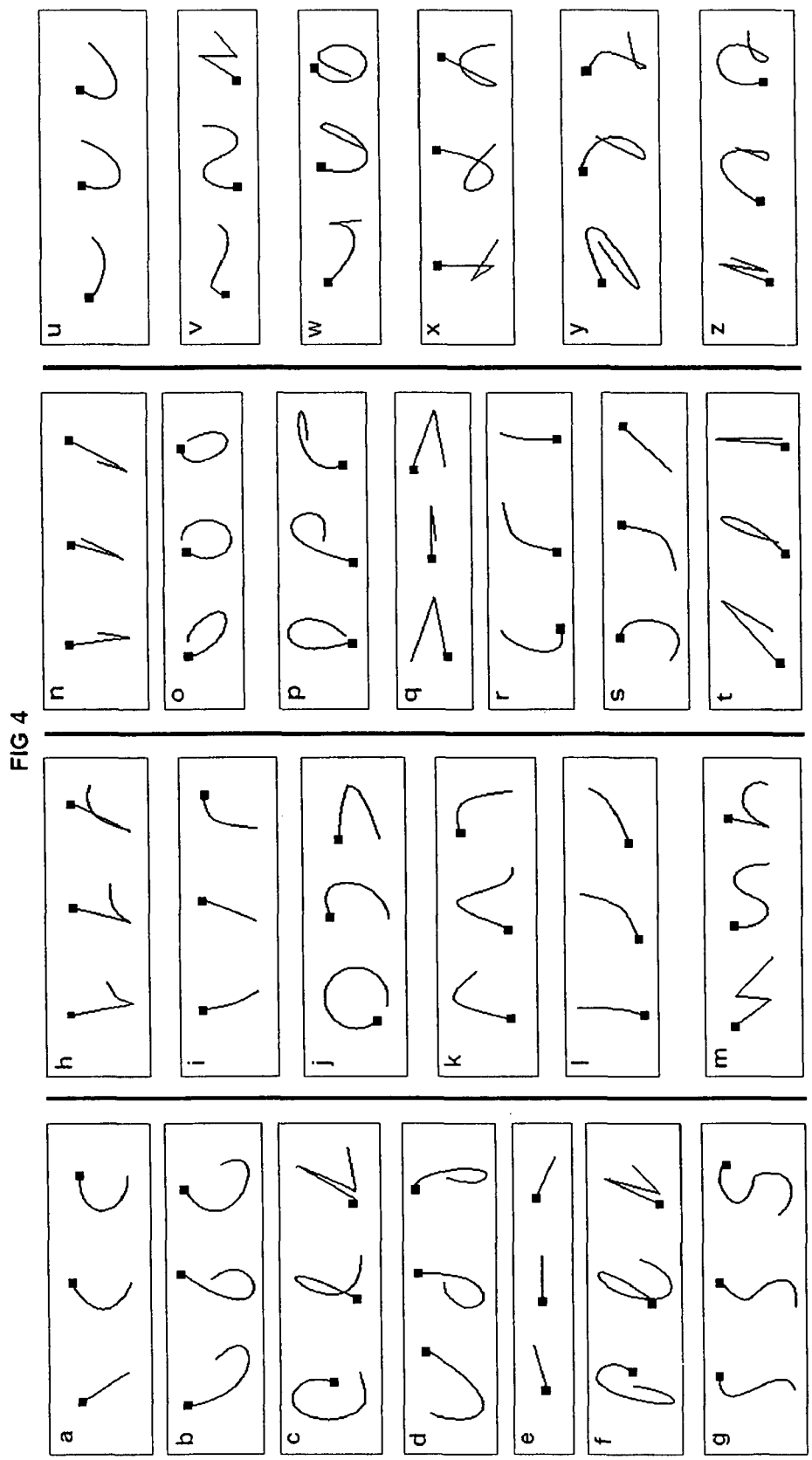
FIG. 4. illustrates the rough stroke boundaries for the preferred alphanumeric system of 26 universal symbols.

Entire groups of symbols can be eliminated in the recognition process based solely on initial stroke direction. Rough stroke boundaries are illustrated in FIG. 4 wherein the three stroke examples provided for each letter will all be recognized as the same symbol and still produce the indicated letter under the multi-step criteria identification process. Thus, the first and last symbol in the series of three symbols represent the maximum acceptable deviations in the stroke patterns that will still result in the same symbol being recognized by the program. The center symbol represents the ideal stroke patterns that make up the symbol. The primary strokes are fully compatible with any Latin derived language and were devised through extensive testing. By visual comparison between the universal computer script symbols and their associated Latin characters (FIG. 2), the strong similarities can be seen. This makes the symbols easy to learn for most writers of Latin derived alphabets. The stroke patterns are prioritized for writing efficiency. In general, the more often a symbol is used (e.g., vowels) the more simple it is. An effort was made in the assignment of symbols such that the most commonly used characters have the simplest strokes while the more complex symbols were assigned to the statistically least used characters. Thus the symbols associated with the vowels are simple while the symbols associated with the eight single consonants (i.e. those consonants rarely paired h, j, q, v, w, x, y, z) are more complex.

After smoothing the trace path, the program analyzes some or all of the following different parameters to identify and distinguish which characters are associated with the given trace path: start and end points, trace path start quadrant; first trace path stroke slope; first trace path stroke critical angle (shallow and sharp); second trace path subsequent stoke critical angle (shallow or sharp); trace path length (long or short); flatness of trace path (based on the vertical extent of the trace path); concavity and convexity (taken from two point trace paths having shallow curves with no direction change for X or Y coordinates); a critical point differentiator (a specific pair of trace path points used to distinguish extremely similar symbols); and the number of trace path points (an ID number assigned to the summation of the start point, change points and end point.) The subroutines or program elements required to perform the aforementioned individual analysis on a Cartesian coordinate mapping array of XY coordinate points (as well as the trace smoothing) would be well known to one skilled in the art.

The trace path start quadrant is determined by the direction of the first stroke in the trace path as illustrated in FIG. 11. The first trace path stroke slope is calculated by algorithmic determination of "the best fit" line between the start point and the first change point or end point in the event there is no change point. Each trace path stroke slope is defined as either shallow or sharp depending upon which side of the critical angle it resides on.

The trace path length (start point to end point) is calculated by algorithmic determination to be long or short based on a predefined value. This predefined value has been determined by experimentation. The flatness of trace path is calculated by algorithmic determination of the vertical limits of the trace path and is either flat or not as compared to a reference. Again, a predefined value of flatness determined by experimentation is used as the reference.

Concavity and convexity is calculated by algorithmic determination of the deviation of the midpoint or maximum distance of the trace path stroke from a line taken from the start and end points of that specific trace path stroke. The critical point pair are two points in a symbol that can be used to distinguish (in very specific identifications) between two very similar symbols. The critical points may be taken as the start and end points, two points on opposite sides of a change point or two points equidistant form the start point and the end point. There are very few symbol differentiations that utilize critical point pairs. Each of these critical point pairs have been experimentally determined for use between specific symbols.

The number of trace path points is an algorithmic assignment of an ID number related to the summation of the start point, change points and end point (these are known as important points).

Figure 9A:
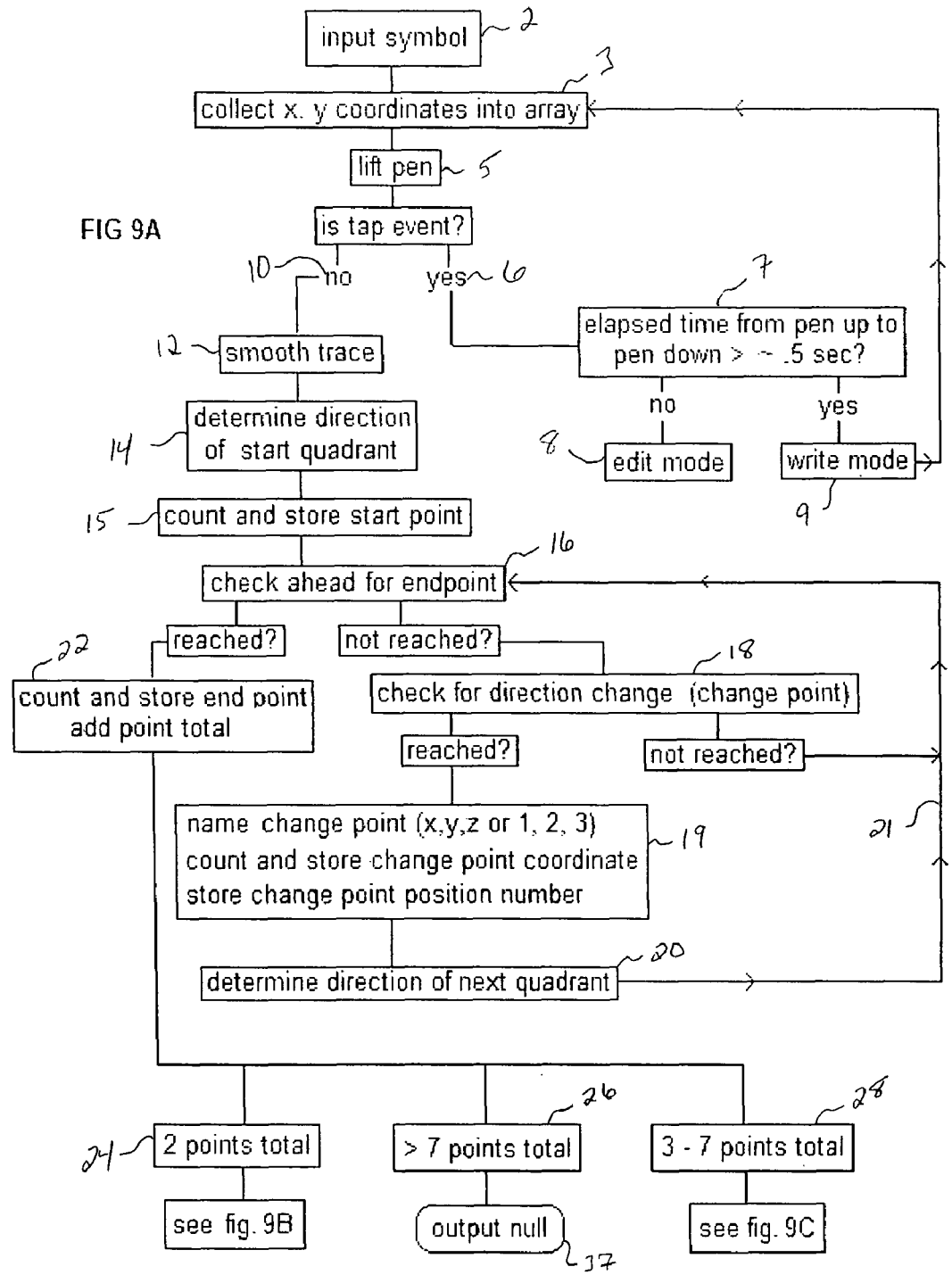
FIGS. 9A, 9B, 9C. is a simplified block diagram showing an overview of various steps for handwriting recognition under the invention.
Figure 9B:
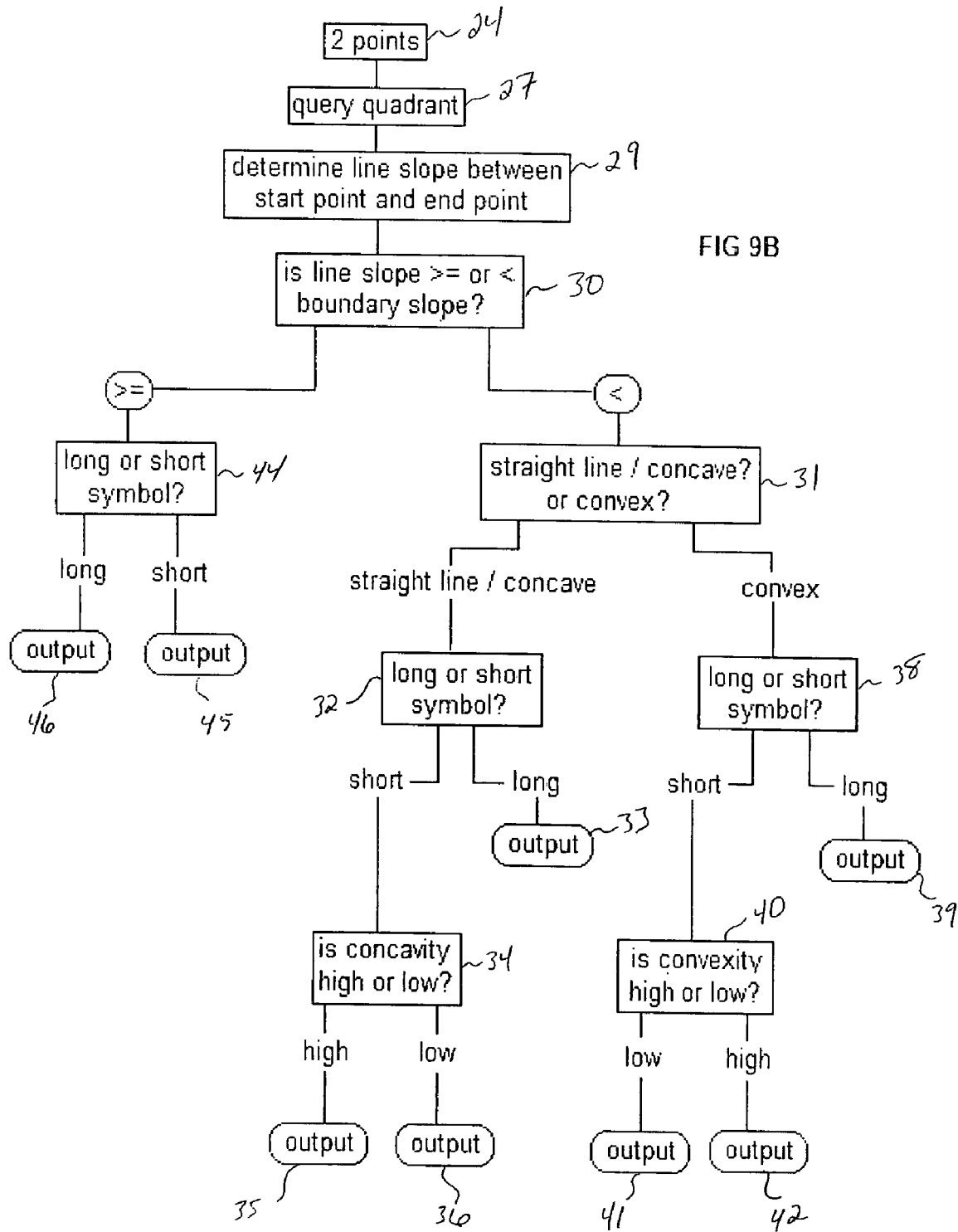
Figure 9C:
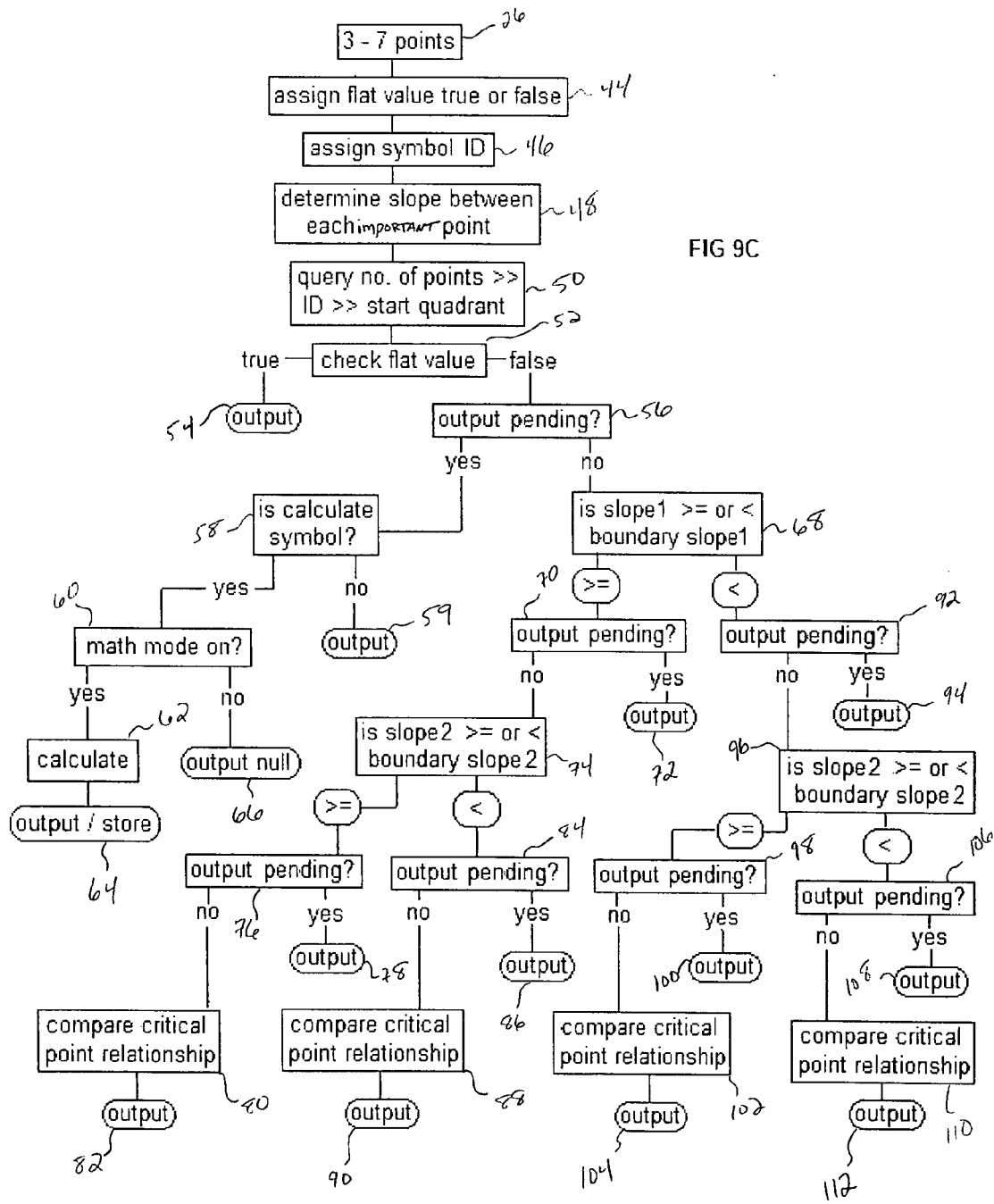

FIGS. 9A, 9B AND 9C comprise a block diagram which provides an overview of the various steps in the handwriting recognition system of the present invention. In operation, the system functions as described below.

The user enters a symbol on a writing surface via a stylus 2. The term "stylus" should be understood to include any writing device including but not limited to a stylus, electronic pen, or one's finger. The "writing surface" may be any electronic pressure or touch sensitive surface (generally a processor implemented device) or a digitizing tablet that can take and store in buffer memory numerous sequentially time incremented symbols and outline trace coordinates in an XY Cartesian Coordinate system. Pressure contact of the stylus with the writing surface is how the symbols are entered into the computer. When the stylus is in pressure contact and moving on the writing surface, the writing surface captures the stroke as XY Cartesian Coordinate system points crossed by the stylus. As the user writes on the writing surface a sampling poll is taken of the pen tip position every few μsec (computing device dependant). The poll timing of the x, y coordinates will vary with the processor speed of the individual computing device but 10 μsec is a common period between samples. Each sampling is used to build an array 3 into temporary memory of (x,y) Cartesian co-ordinates which describes the trace path. When the user lifts the stylus from the writing surface 5, an initiating event occurs wherein the recognition engine the analyzes the trace path. If the trace is a dot 6, (recognized as a single set of coordinates) the Edit mode is invoked 8. When invoked, the system goes into edit mode for a brief period, approximately one-half second 7. If the pen does not touch the screen again within that time frame the system reverts to the Write mode 9. Edit mode 8 is therefore initiated by a tap (dot) and then actuated by touching (or drag highlighting) the target edit location within a specified time frame as is well known in the industry. Input of further symbols will allow the user to affect different changes to characters or groups of characters previously assigned.

If the Edit mode has not been invoked 10, the primary memory is cleared, and the next stroke pattern is ready to be received 2. Once the trace path's (x,y) coordinates are stored in the array 3, and the edit mode has not been initiated 10, the trace path is smoothed 12. Trace path smoothing is accomplished in one of two ways. First, by establishing a minimum distance between sets of coordinate pairs, and removing coordinates pairs that fall below a minimum distance (too close together), or second, (preferred) by picking two non adjacent coordinate pair positions which are several points away from the start point and determining their distance apart. If the distance is below an experimentally determined value the points are close together and a certain number of coordinates are skipped over within the trace array during the initial trace analysis. If the distance is above that value the point spread is relatively far apart and fewer points are then skipped. The number of required skipped points will vary between different digitizers but zero to three is normal. For either type of trace path smoothing, a minimum average distance between trace path points must exist for quality recognition to occur. Because different computers poll at different rates, a method to compensate for a too low output of trace path points must be provided. This system offers the user settings beyond the default polling rate which double or triples the default polling rate. In this way the user can choose a setting which will optimize recognition for many types of computers. Note, the polling rate for the computing system used may be adjustable or may be a fixed value based on the physical configuration of the unit. The time units of polling may vary widely. Now that the trace path is smoothed 12, a start quadrant is assigned 14 based on initial stroke direction. Once the initial raw data and has been stored 3 and smoothed 12, and the initial start quadrant determined 14 the following steps are performed:

1. Once the start quadrant is determined, coordinate pair one is designated and stored as the start point 15. The program then checks ahead and identifies change points or the endpoint 16. In the process it identifies and records change points 18; gives each a name (or no) 19; records the direction of each new stoke flow 20 (1, 2, 3, or 4) which is created between start point and end point, start point and change point, change point and change point or change point and end point; stores the position number of each change point within the array, and adds and records the total number or important points. This cycle continues 21 until an endpoint is reached 22. As previously written, each change point is given a name, x, y, or z (or numbered 1, 2, 3), the direction of each stroke is recorded, the endpoint is established as the final coordinate pair minus one, and the total number of important points is recorded and is equal to the sum of the start point+change point(s)+end point. The position number of the change point is recorded because it is a useful critical point reference coordinate which may be later needed to help identify the boundary between two neighboring strokes in this system. A change point occurs when either of the x or y coordinate trace paths experience a magnitude reversal. In way of an example, looking at the following time incremented Cartesian coordinates array of (5, 9) (5, 10) (5, 11) (6, 12) (7, 13) (8, 14) (9, 13) (10, 12) (9, 12) (8, 11) (10, 13) there are three change points. A y change point occurs between (9, 13) (10, 12); an x change point occurs between (10, 12) (9, 12); and a simultaneous x and y change point (known as the z change point) occurs between (8, 11) (10, 13). Once the cycle of change point data accumulation 21 has been completed and an end point has been reached with its data accumulated, the number of important points are segregated into three groups: 2 points total 24; greater than 7 points total 26; and 3 to 7 points total 28.

2. If there are more than 2 important points skip to step 7.

3. If there are just two important points 24, a start point and an end point, query the quadrant 27 and calculate the slope of the line connecting the two points 29; determine if the line slope is greater than, equal to, or less than a critical angle (boundary slope) 30 (FIGS. 10 & 11); if it is less than the boundary slope, determine if it is a straight line, is concave, or convex 31; if it is a straight line/concave determine if the symbol is short or long 32; if it is long, recognition is accomplished and an output is generated 33. A critical angle is determined through experimentation. It establishes a boundary that separates two "neighboring" symbols. It is also referred to as a boundary angle or boundary line. Each symbol has one or more boundaries (critical angles). The universal computer script system is made up of a complex matrix of these tight fitting boundaries. Like a well made puzzle it has no gas or overlaps between the "pieces."

4. If the symbol is short, test to determine if the degree of concavity is high or low 34. If the symbol is short, the degree of concavity (high or low) determines the output. If the degree of concavity is high, recognition is accomplished and output is generated 35. If the degree of concavity is low, recognition is accomplished and an output is generated 36. (A straight line or nearly a straight line would not be recognized the same as a more defined curved line.)

5. If the line slope is less than the boundary slope 30, and is determined to be convex 31; test for relative length 38. If the symbol is long, recognition is accomplished and an output is generated 39. If the symbol is short, the degree of convexity (high or low) 40 determines the output. If the degree of convexity is high, recognition is accomplished and output is generated 42. If the degree of convexity is low, recognition is accomplished and an output is generated 41.

6. If the line slope is greater than or equal to the boundary slope 30, test for relative length 44. If the symbol is long recognition is accomplished and an output is generated 46. If the symbol is short recognition is accomplished and an output is generated 45.

7. If there are more than 7 points output is null 37. If the number of change points plus the start point and end point is between 3 and 7 26, assign a flat value 44 (true or false) by determining if a maximum value of each stroke is exceeded or if a maximum vertical range of the start point, change point (s), and the end point is exceeded;

8. Assign a symbol category identifier by either combining the change point letter name(s) together (concatenate first, to second, to third, etc.) or using a base three construction to create an ID number 46. For example, a five point stroke having first, a change in x, second a change in y, and third a change in both x and y simultaneously would receive the category name "xyz." To produce an ID number using the above example, the x, y, z would be replaced by 1, 2, 3, and using a base three conversion, the ID number produced would be $1 \times 3^2 + 2 \times 3^1 + 3 \times 3^0$ (9+6+3) or 18. The category ID when queried with the start quadrant direction greatly reduces the remaining number of symbol possibilities.

9. Calculate the stroke slope between the points 48, (In the way of a four point example, it would calculate the slope of start point to change point, change point to change point, change point to end point). Query the number of points, the category ID and the start quadrant 50. Check the flatness 52 and if found to be true and output is generated 54. If flatness is false an output may be pending 56. If so, the output may be a symbol or command and output will be generated 59. If however, the stroke is the calculate command 58, and the math mode is determined to be "on," 60 calculate the mathematical formula 62, and output a value 64 and store it for possible future calculations. If program is not in math mode and output a null character 66.

10. If an output is not yet pending, check if the pertinent first stroke slope (generally the first quadrant but not always is greater than, equal to, or less than the first critical angle ($1^{st}$ boundary slope) 68. From this test, an output may be pending and consequently generated. If the first stroke slope is greater than or equal to the first boundary slope 70, and an output is pending recognition is accomplished and an output is generated 72. However, if an output is not generated at this point, a second stroke slope comparison (generally the last quadrant) must be made as above 74. If the second stroke slope is greater than or equal to boundary slope number 2 and an output is pending 76 recognition is accomplished and an output is generated 78. Output is usually pending at this stage but several strokes may require a final point relationship test 80; recognition is accomplished and an output is generated 82. The critical point relationship is the determining factor in symbols that the recognition engine interprets as neighboring symbols. In neighboring symbols there lies one specific point difference (the critical point) which is experimentally determined. If that point distance is greater than a default value it is one "neighbor." For example, the stroke pattern of the o and b in this invention can be identical. The relationship between the y coordinate of the start point and the y coordinate of the endpoint is used to differentiate between the two symbols 11. If the second stroke slope is less than boundary slope number 2 and an output is pending 84 recognition is accomplished and an output is generated 86. If output is not pending, the critical point relationship is checked 88, recognition is accomplished and an output is generated 90.

12. If the first stroke slope is less than the first boundary slope 92, and an output is pending recognition is accomplished and an output is generated 94. However, if an output is not generated at this point, a second stroke slope comparison (generally the last quadrant) must be made as above 96. If the second stroke slope is greater than or equal to boundary slope number 2 and an output is pending 98 recognition is accomplished and an output is generated 100. Output is usually pending at this stage but several strokes may require a final point relationship test 102; recognition is accomplished and an output is generated 104.

13. If the second stroke slope is less than the boundary slope number 2 and an output is pending 106 recognition is accomplished and an output is generated 108. Output is usually pending at this stage but several strokes may require a final point relationship test 110; recognition is accomplished and an output is generated 112.

14. If the number of change points plus the start point and end point is greater than 7 90 no output is generated 92.

Figure 10:
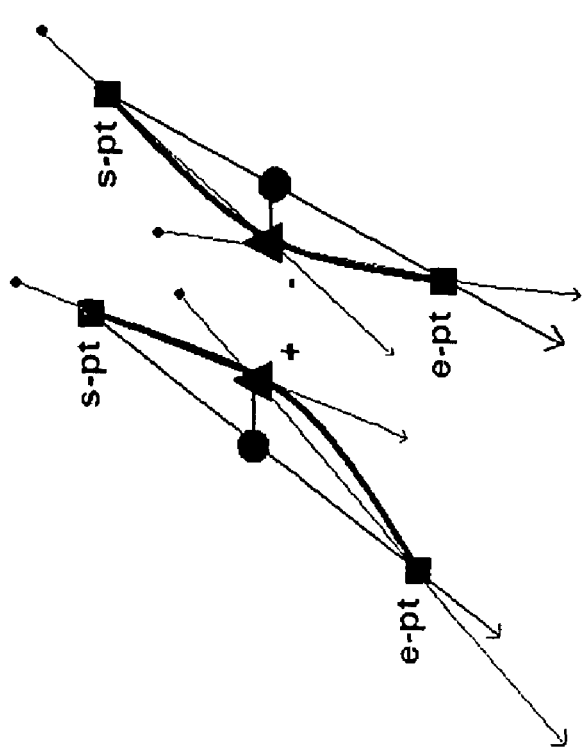
FIG. 10. illustrates how the recognition engine identifies shallow curves.

FIG. 10, provides a more detailed illustration of how the recognition program identifies shallow curves. Additionally, FIG. 11 is provided to further detail the successive identification criteria procedure the recognition program undertakes in identifying the present inventions preferred symbol (stroke path) for the letter y as compared to the letter z (neighboring symbols). It further details the concept of quadrants, the stroke slope, and the critical angle description, their potential values, and comparisons between the two.

The preferred stroke path of each symbol under this invention is illustrated in FIG. 1, however, many variation or permutations are described within the program. Some strokes representing a Latin symbol or command have only a single start quadrant and one category ID definition, while others have up to a dozen or more category Ids and several start quadrant possibilities. For example, the category name of the letter m in this invention may be yy, zy, yyx, xyy, yyy, xyyx, to name a few. Every reasonable variation for each symbol is included and even variations that might be a result of sloppy penmanship. Any category name that is not considered a reasonable variation is not included and if accidentally written will result in no output (a null character).

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

The invention claimed is:

1. A microprocessor implemented method of recognizing handwritten, independent symbols comprising:
   recognizing a trace path upon a digitizer surface;
   determining the following parameters of the trace path:
      a start quadrant of a first trace path stroke;
      a line slope of all trace path strokes;
      a first critical angle of a first trace path stroke;
      a second critical angle of a second trace path stroke;
      a trace path length;
      a flatness of said trace path;
      a concavity and convexity of a trace path stroke;
      a critical point differentiator; and
      a summation of the number of trace path points; and
   outputting a Latin derived character to a visual display based upon the parameters of the trace path.

2. The microprocessor implemented method of recognizing handwritten, independent symbols of claim 1 wherein said first and second critical angles are defined as the angle of a line bisecting a start quadrant.

3. The microprocessor implemented method of recognizing handwritten, independent symbols of claim 1 wherein said first and second critical angles are discreetly defined in said algorithmic analysis program for distinction between specific symbols.

4. The microprocessor implemented method of recognizing handwritten, independent symbols of claim 1 wherein said start quadrant is determined by the direction of the first trace path stroke.

5. The microprocessor implemented method of recognizing handwritten, independent symbols of claim 2 wherein said start quadrant is determined by the direction of the first trace path stroke.

6. The microprocessor implemented method of recognizing handwritten, independent symbols of claim 3 wherein said start quadrant is determined by the direction of the first trace path stroke.

7. A microprocessor implemented method of recognizing handwritten, independent symbols and outputting the corresponding Latin derived alphabetic character comprising the steps of:
   (a) receiving an electronic stylus input comprising a trace path of one or more symbols selected from a first or second set of a universal computer script of a Latin derived alphabet;
   (b) sequentially timed Cartesian coordinate mapping of the trace path;
   (c) if the trace path is a dot made within 0.5 seconds from the last trace path, engaging an edit mode of the program;
   (d) if not a dot, smoothing of the trace path;
   (e) determining in which quadrant the trace path starts and assigning that start quadrant to that trace path;
   (f) assigning change points by determination of changes in x direction, y direction, and in both the x and y direction simultaneously and determining an end point of the trace path;
   (g) summing the number of direction change points start point and an end point;
   (h) if the sum is two proceeding to step (k);
   (i) if the sum is three to seven proceeding to step (w);
   (j) if the sum is greater than seven non assignment of a character and returning to step (a) with a next new stylus input;
   (k) determining the slope of the line between the start point and the end point, or the start point and the change point, or a change point and a change point or the change point and an end point;
   (l) determining if the slope of the line is greater than (shallow) or less than (sharp) an assigned first critical angle (or boundary slope);
   (m) if the slope is sharp proceeding to step (o);
   (n) if the slope is shallow, based on start quadrant determining if the trace path is short or long and generating a character and return to step (a);
   (o) if slope is sharp, based on start quadrant determining the concavity or the convexity;
   (p) determining if the trace path is long or short, and if long, generating a character and returning to step (l);
   (q) if trace path is short assigning a flat value to trace path (high or low concavity);
   (r) establishing a base three identification number or concatenating the change point name(s) (x, y, z) into an ID name;
   (s) calculating the slope of the lines between all points;
   (t) checking the trace path flatness and ID name;
   (u) if trace-path is flat, generating a character and returning to step (a);
   (v) if trace path is not flat, assigning a character and returning to step (a);
   (w) checking the trace path for flatness and assigning an ID name;
   (x) determining the slope between start point, change points and end point (the important points);
   (y) querying the number of points, the assigned ID and the start quadrant;
   (z) checking for flatness and assigning a value;
   (aa) if flat assigning a value, if not flat possible determining output value;
   (ab) if not flat but an output value is generated checking for presence of a calculate symbol and a math mode, calculating a mathematical formula to generate an output value and returning to step (a);
   (ac) if not in math mode, outputting no value and returning to step (a);
   (ad) if unable to generate character and a calculate symbol is not present, testing stroke slope against a first critical angle;
   (ae) if first critical angle is shallow, generating a character if possible and returning to step (a);
   (af) if unable to assign a character testing a second stroke slope against a second critical angle
   (ag) if first critical angle is sharp testing a second stroke slope against a second critical angle;
   (ah) if identification is possible, assigning a character and returning to step (a);

(ai) if identification is not possible, comparing a critical point relationship, assigning a character, and returning to step (a);
(aj) if first critical angle is shallow testing a second stroke slope against a second critical angle;
(ak) if identification is possible, assigning a character and returning to step (a);
(al) if identification is not possible, comparing a critical point relationship, assigning a character, and returning to step (a);
(am) if first critical angle is sharp, generating a character if possible and returning to step (a);
(an) if unable to assign a character testing a second stroke slope against a second critical angle;
(ao) if first critical angle is sharp testing a second stroke slope against a second critical angle;
(ap) if identification is possible, assigning a character and returning to step (a);
(aq) if identification is not possible, comparing a critical point relationship, assigning a character, and returning to step (a);
(ar) if first critical angle is shallow testing a second stroke slope against a second critical angle;
(as) if identification is possible, assigning a character and returning to step (a);
(at) if identification is not possible, comparing a critical point relationship, assigning a character, and returning to step (a).

8. The method of claim 7 wherein a sharp line is determined as a line having a slope less than a slope of a line bisecting the start quadrant, and a sharp line is determined as a line having a slope greater than the slope of a line bisecting the start quadrant.

9. The method of claim 7 wherein a shallow line is determined as a line having a slope greater than a discrete critical angle based on the same indicators used to narrow the recognition to the symbols in question, and a sharp line is determined as a line having a slope greater than said critical angle.

10. The method of claim 7 wherein said edit mode is a timed interval algorithmic program that initiates changes to characters or groups of characters previously assigned based on the input of further symbols.

11. The method of claim 7 further comprising storing a symbol trace path in memory; translating said symbol via a multi-step recognition program into a corresponding Latin alphabet derived letter; and outputting the corresponding Latin alphabet derived letter produced from the translating step to a visual interface.

* * * * *